United States Patent Office 3,365,450
Patented Jan. 23, 1968

3,365,450
1,3-DISUBSTITUTED-4-(2-AMINOETHYL)-2-IMIDAZOLIDINONES
Carl D. Lunsford, Richmond, and Albert D. Cale, Jr., Bon Air, Va., assignors to A. H. Robins Company, Inc., Richmond, Va., a corporation of Virginia
No Drawing. Original application Dec. 31, 1964, Ser. No. 422,570, now Patent No. 3,337,580, dated Aug. 22, 1967. Divided and this application Dec. 28, 1966, Ser. No. 605,199
15 Claims. (Cl. 260—247.2)

ABSTRACT OF THE DISCLOSURE 1,3 - disubstituted - 4 - (2 - aminoethyl) - 2-imidazolidinones; useful as analeptics and hypotensives.

---

The present application is a division of Ser. No. 422,570, filed Dec. 31, 1964, now Patent No. 3,337,580.

The present invention relates to certain novel heterocyclic organic compounds which may be referred to as substituted 2-imidazolidinones, and is more particularly concerned with 1,3 - disubstituted-4-(2-aminoethyl) - 2-imidazolidinones, compositions thereof, and methods of making and using the same.

The invention is especially concerned with novel imidazolidinone compounds having the formula:

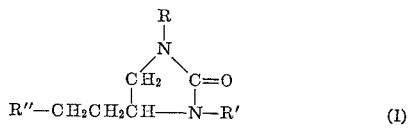

(I)

wherein R is selected from the group consisting of lower-alkyl, lower-alkenyl, phenyllower-alkyl, cycloalkyl, and cycloalkenyl,
wherein R' is selected from the group consisting of phenyl, lower-akylphenyl, di-lower-alkylphenyl, lower-alkoxyphenyl, holaphenyl, trifluoromethylphenyl, lower-alkyl-halophenyl, lower-alkylmercaptophenyl, di-lower-alkyl-aminophenyl, and naphthyl, and
wherein R" is amino.

The compounds of the invention having the foregoing Formula I are generally characterized by important pharmacological activity, indicative of their use in counteracting certain physiological abnormalities in an animal body. The compounds are analeptics, hypotensives, or both. Certain compounds of the series are potent analeptics, stimulating respiration and antagonizing central nervous system depression and exhibiting a particular antagonism against barbiturate-induced depression or poisoning at dose levels considerably below that at which untoward side effects occur. While the degree and relative degree of their activities vary, all compounds tested exhibited analeptic activity, although, as stated, because of the relative degree of activity, some are preferred as hypotensives. The salts have special utility in that they are water-soluble and have an extended duration of activity.

The activity of the active agents of the present invention, as evidenced by tests in lower animals, is indicative of utility based on their valuable activity in human beings as well as in lower animals. Clinical evaluation in human beings has not been completed, however. It will be clearly understood that the distribution and marketing of any compound or composition falling within the scope of the present invention for use in human beings will of course have to be predicated upon prior approval of governmental agencies, such as the U.S. Federal Food and Drug Administration, which are responsible for and authorized to pass judgment on such questions.

It is accordingly an object of the present invention to provide new and useful 1,3-disubstituted-4-(2-aminoethyl) - 2 - imidazolidinones, compositions thereof, and methods of making and using the same. Other objects of the invention will be apparent to one skilled in the art, and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. "Lower alkoxy" has the formula —O-lower-alkyl. The term "lower-alkenyl" includes straight and branched chain radicals of two up to eight carbon atoms inclusive and is exemplified by such groups as vinyl, allyl, methallyl, 4-pentenyl, 3-hexenyl, and 3-methyl-3-heptenyl. The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. The term "cycloalkenyl" as used herein includes cyclic alkenyl radicals containing up to nine carbon atoms inclusive and encompasses the named cycloalkyl radicals having one or more double bonds, including such usual radicals as 1- and 2-cyclohexenyl and 1- and 2-cyclopentenyl. Included in the term "phenyllower-alkyl" are groups such as benzyl, phenethyl, methylbenzyl, phenpropyl, and the like. As stated, the radical R in the foregoing Formula I is inclusive of such groups as lower-alkyl, cycloalkyl, cycloalkenyl, and phenyllower-alkyl, which groups are all preferably radicals of a solely hydrocarbon nature.

When halogen is referred to herein, preferably but not necessarily a halogen of atomic weight in excess of nineteen but not greater than eighty is employed. Of the halogens, chlorine is preferred.

Among the suitable amino radicals included within the symbol R" are primary, secondary and tertiary amino radicals, such as unsubstituted amino (—$NH_2$); lower-alkyl-amino; di-lower-alkyl-amino; lower-alkenyl-amino; di-lower-alkenyl-amino; phenylamino; (hydroxy-lower-alkyl)-amino; di-(hydroxy-lower-alkyl)-amino; lower-alkyl-(hydroxy-lower-alkyl)-amino; basic saturated monocyclic heterocyclic radicals having up to a maximum of twelve carbon atoms, as exemplified by piperidino; lower-alkyl-piperidino, e.g., 2-, 3-, or 4-lower-alkyl-piperidino; di-lower-alkyl-piperidino; e.g., 2,4-, 2,6-, or 3,5-di-lower-alkyl-piperidino; lower - alkoxy - piperidino; pyrrolidino; lower-alkyl-pyrrolidino; di-lower-alkyl-pyrrolidino; lower-alkoxy-pyrrolidino; morpholino; lower-alkyl-morpholino; di-lower-alkyl - morpholino; lower - alkoxy - morpholino; thiomorpholino; lower - alkyl - thiomorpholino; di-lower-alkyl-thiomorpholino; lower-alkoxy-thiomorpholino; piperazino; lower-alkyl-piperazino (e.g., C- or $N^4$-methyl-piperazino); di-C-(lower-alkyl)-piperazino; $N^4$ - (lower-alkyl)-C-(lower-alkyl)-piperazino; N - (hydroxy - lower-alkyl)-piperazino; N-(lower-aliphatic acyloxy) and (especially lower-alkanoyloxy lower-alkyl)-piperazino [e.g., N-(acetoxy-, isobutyroxy-, or octanoyloxyethyl or propyl)-piperazino]; lower-alkoxy-piperazino; N'-lower-alkoxy-lower-alkylpiperazino, e.g., N'-ethoxyethylpiperazino; and lower-carbalkoxy-piperazino.

Included within the scope of "-N-(lower-alkanoyl)-amino" are the corresponding tertiary amino radicals designated -N-(lower-alkanoyl)-N - lower - alkylamino. The term "carbamyl" encompasses not only the primary amino-containing carbamyl radicals, but also the corresponding N-phenyl- and N-(lower-alkyl)-carbamyl and N,N-di-(lower-alkyl)-carbamyl radicals as well as the corresponding N,N-diphenyllower-alkyl, N,N-monocyclic alkyl, and saturated heterocyclic carbamyl radicals, wherein the saturated monocyclic heterocyclic radical is as set forth under the definition of "amino" in the foregoing. The amino moiety of the carbamyl radical is additionally variable in accord with the definition of "amino" previously given.

Among the suitable substituted phenyl radicals are phenyl radicals substituted by any radical or radicals which are not reactive or otherwise interfering under the conditions of reaction, such as lower-alkoxy, lower-alkylmercapto, lower-alkyl, di-lower-alkyl-amino, trifluoromethyl, halo, and the like. The substituted-phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl, lower-alkoxy, lower-alkylmercapto, and di-lower-alkyl-amino substituents each have preferably from one to four carbon atoms which can be arranged as straight or branched chains. A total of nine carbon atoms in all ring substituents is the preferred maximum.

Since R″ is amino, the compounds of Formula I may be converted to and are most conveniently employed in the form of non-toxic pharmaceutically acceptable acid addition or quaternary ammonium salts. Such salts also have improved water-solubility. Although the non-toxic salts are preferred, any salt may be prepared for use as a chemical intermediate, as in the preparation of another but non-toxic acid addition salt. The free basic compounds of Formula I may be conveniently converted to their quaternary ammonium or acid addition salts by reaction of the free base with the selected acid or acid ester, e.g., an alkyl, cycloalkyl, alkenyl, cycloalkenyl or aralkyl halide, sulfate, or sulfonate, preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid addition salts are those derived from mineral acids such as hydrochloric acid, hydrobromic acid, hydriodic acid, nitric acid, sulfuric acid, and phosphoric acid; and organic acids such as acetic acid, citric acid, lactic acid, fumaric acid, and tartaric acid. The preferred acid addition salt is the hydrochloride. The quaternary ammonium salts are obtained, e.g., by the addition of alkyl, cycloalkyl, alkenyl, cycloalkenyl, or aralkyl esters of inorganic acids or organic sulfonic acids, to the free base form of the selected tertiary amino compound. The alkyl, cycloalkyl, alkenyl, cycloalkenyl, or aralkyl esters so used include such compounds as methyl chloride, methyl bromide, methyl iodide, ethyl bromide, propyl chloride, allyl chloride, allyl bromide, dimethyl sulfate, methyl benzene-sulfonate, methyl p-toluene sulfonate, benzyl halides such as p-chlorobenzyl chloride and p-nitrobenzyl chloride, and the like.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

When there are two or more basic nitrogen atoms present in the compounds of the invention, poly-acid-addition salts may be obtained by employing the proper increased molar ratios of acid to the free base.

The following Chart I illustrates the process of the invention and shows the various procedures involved both in preparing the starting materials and the final products of the invention. In Chart I, all the symbols have the values previously assigned.

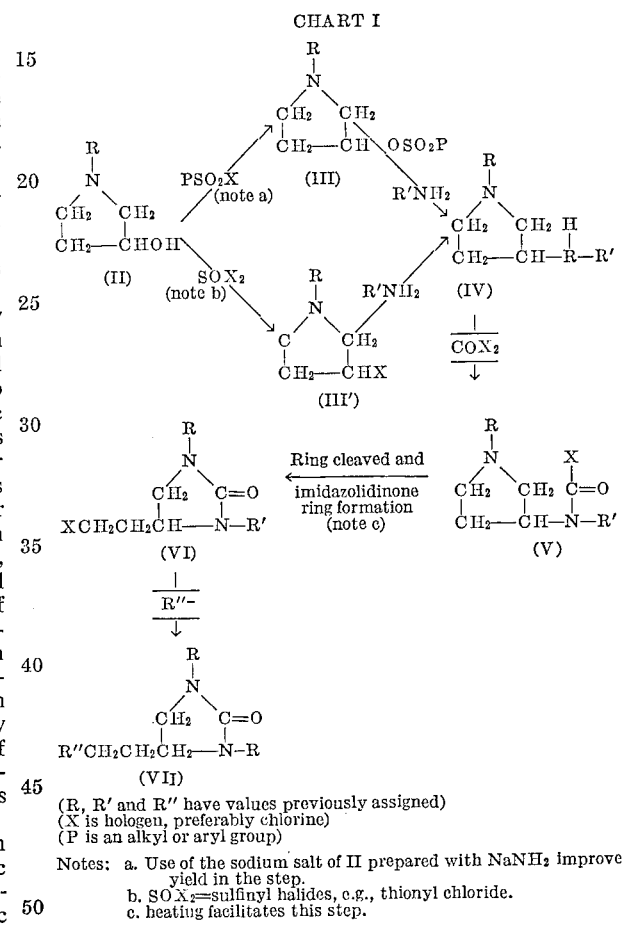

(R, R′ and R″ have values previously assigned)
(X is hologen, preferably chlorine)
(P is an alkyl or aryl group)

Notes: a. Use of the sodium salt of II prepared with NaNH₂ improves yield in the step.
b. SOX₂=sulfinyl halides, e.g., thionyl chloride.
c. heating facilitates this step.

The starting materials for the process of the present invention are the appropriately substituted 3-aminopyrrolidines, represented in Chart I by Formula IV. These materials (IV) may in turn be obtained from a 1-substituted-3-pyrrolidinol, shown as Formula II.

As illustrated in the chart, a 1-substituted-3-pyrrolidinol (II) is converted to a 1-substituted-3-halo- or 3-alkylsulfonyloxy- or 3-arylsulfonyloxy-pyrrolidine (III) by reaction with an agent such as thionyl chloride or bromide, or an alkyl- or aryl-sulfonyl halide, and allowing the thus-formed 3-halo or 3-sulfonyloxy-pyrrolidine to react with a primary amine to produce a compound of Formula IV, the starting material of the present invention.

As a general procedure for preparing the starting materials (IV), a suspension of sodamide in an appropriate solvent, e.g., dry toluene, is placed in a suitable reaction vessel, such as a three-liter three-necked round-bottomed flask equipped with stirrer, reflux condenser, thermometer and dropping funnel. The dispersion is maintained at a suitable temperature, generally less than about 50° C., during the dropwise addition of a 1-substituted-3-pyrrolidinol to the reaction medium. A solution of an arylsulfonyl halide is then added to the reaction mixture while maintaining a reduced temperature, e.g., about 0–10° C. Arylsulfonyl halides such as p-toluenesulfonyl chloride and benzene-sulfonyl chloride in toluene solution may be employed in the formation of the desired sulfonates. Stirring of the reaction mixture is continued for an additional period, generally about two hours, while allowing the temperature to rise slowly to about 20–30° C. The reaction mixture is then washed several times with cold water to remove any remaining unreacted reactants. The toluene extract containing the pyrrolidine-3-sulfonate is dried with a suitable drying agent such as calcium sulfate. After removal of the drying agent, the toluene may be removed by evaporation and the residual sulfonate allowed to react with a primary arylamine, which is preferably employed in excess. The arylamine is added to the sulfonate and the temperature raised to a level of about 150–175° C. for an extended period, such as five to ten hours. The length of time and temperature required for the reaction are dependent upon the type of arylamine used in a particular preparation. On termination of the heating or reflux period, any unreacted arylamine may be removed under reduced pressure (as by water aspirator vacuum) and the remaining concentrated residue may be neutralized with an acid such as cold dilute hydrochloric acid. The resulting aqueous solution of the salt, e.g., the hydrochloride, of the desired base may then be neutralized with a strong caustic solution (as for example 50% aqueous sodium hydroxide) to yield the free aminopyrrolidine base. The free base may be separated by extraction with ether and dried in the usual manner (i.e., with calcium sulfate). The product may be isolated and purified by distillation under reduced pressure. In some preparations, the free bases may be advantageously converted to their acid addition salts, e.g., the fumarate or cyclohexylsulfamate salt.

The following preparations are given by way of illustration only and are not to be construed as limiting.

PREPARATION 1.—1-METHYL-3-ANILINOPYR-ROLIDINE

A dry toluene (1 liter) suspension of sodamide (2 moles) was placed in a 3-liter, 3-necked, round-bottomed flask equipped with a stirrer, reflux condenser, thermometer and dropping funnel. While maintaining the dispersion at a temperature of 15–40° C., 1-methyl-3-pyrrolidinol (2 moles) was added dropwise. On completing the addition of the pyrrolidinol, the reaction mixture was stirred for two hours, gradually lowering the temperature to 10° C. A dry toluene (1 liter) solution of p-toluenesulfonyl chloride (2 moles) was added dropwise maintaining the temperature at less than 20° C. The reaction mixture was stirred for two hours at 20–30° C. and then washed with cold water (2×500 ml.). The toluene extract was dried over anhydrous calcium sulfate (Drierite). After removal of the drying agent, the toluene was removed by evaporation and the concentrated tosylate was allowed to react with aniline (4.4 moles, 10% excess). Reaction of the aniline with the tosylate [(1-methyl-3-pyrrolidyl)-p-toluenesulfonate] was effected by heating at 150° C. for two hours and then raising the temperature to reflux and heating for an aditional three hours. The excess unreacted aniline was removed under reduced pressure (water aspirator vacuum) and the remaining residue treated with a sufficient amount of cold dilute hydrochloric acid to effect solution. The acid solution was extracted several times with ethyl ether, cooled, and made basic with 50% aqueous sodium hydroxide. The free base was removed by extraction with ether. The ether extracts were washed with water and dried over Drierite (anhydrous calcium sulfate). The drying agent was removed by filtration and the ether removed under reduced pressure. The resultant residue was then distilled at reduced pressure, B.P. 124–126° C. at 4 mm. pressure. The product was obtained in 52% yield. The corresponding fumarate salt was obtained from dry isopropanol solvent, M.P. 143–144° C.

*Analysis.*—Calculated for $C_{15}H_{20}N_2O_4$: C, 61.63; H, 6.90; N, 9.58 (fumarate salt). Found: C, 61.58; H, 7.07; N, 9.47.

The following compounds (2 through 12) were prepared in a manner similar to that described in Preparation 1 employing the appropriately substituted pyrrolidinol as starting material. The eleven products were isolated and analyzed, some of their properties being listed in Table I, and analytical data being listed in Table II. Experimental conditions for each of the preparations were substantially the same, except where certain ring-substituted anilines were employed. In those cases, the reaction mixture was heated for longer periods of time (up to 10 hours) at temperatures ranging from 170 to 175° C.

TABLE 1.—PREPARATIONS 2 THROUGH 12

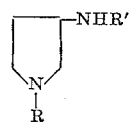

| Preparation No. | Arylaminopyrrolidine | | Boiling Point, °C. | Pressure (mm./Hg) | Yield, Percent | Remarks |
|---|---|---|---|---|---|---|
| | R | R' | | | | |
| 2 | $CH_3$ | ⟨◯⟩—Cl | 94–6 | 0.15 | 12 | Fumarate 129–130° C. |
| 3 | $C_2H_5$ | $C_6H_5$ | 137–9 | 4 | 66 | Fumarate 103–104° C. |
| 4 | $C_2H_5$ | Cl—⟨◯⟩— | 113–5 | 0.05 | 28 | |
| 5 | $C_2H_5$ | $CH_3O$—⟨◯⟩— | 128–30 | 0.15 | 36 | |
| 6 | $C_2H_5$ | $CH_3$—⟨◯⟩—$CH_3$ | 192–3 | 25 | 55 | Fumarate 156–156.5° C. |
| 7 | $CH(CH_3)_2$ | $C_6H_5$ | 140–3 | 4 | 42 | Fumarate 132–134° C. |

TABLE 1—Continued

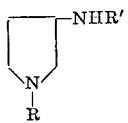

| Preparation No. | Arylaminopyrrolidine R | Arylaminopyrrolidine R' | Boiling Point, °C. | Pressure (mm./Hg) | Yield, Percent | Remarks |
|---|---|---|---|---|---|---|
| 8 | CH(CH₃)₂ | ⟨phenyl⟩—CH₃ | 102–6 | 0.1 | 46 | Fumarate 158–159° C. |
| 9 | CH(CH₃)₂ | ⟨phenyl⟩ with Cl, CH₃ | 120–5 | 0.03 | 41 | Fumarate 165–166° C. |
| 10 | ⟨phenyl⟩ | ⟨phenyl⟩ | 135–8 | 0.05 | 61 | Fumarate 196–197° C. |
| 11 | ⟨phenyl⟩—CH₂ | C₆H₅ | 160–4 | 0.01 | 49 | Fumarate 139–140.5° C. |
| 12 | C₂H₅ | ⟨naphthyl⟩ | 145–50 | 0.05 | 46 | Fumarate 162–163° C. |

TABLE II.—ANALYTICAL DATA ON PREPARATIONS 2 THROUGH 12

| Preparation No. | Empirical Formula | Calculated | | | Found | | |
|---|---|---|---|---|---|---|---|
| | | C | H | N | C | H | N |
| 2 | $C_{15}H_{19}ClN_2O_4$* | 55.13 | 5.86 | 8.57 | 54.91 | 5.60 | 8.39 |
| 3 | $C_{16}H_{22}N_2O_4$* | 62.72 | 7.24 | 9.14 | 62.38 | 7.08 | 9.07 |
| 4 | $C_{12}H_{17}ClN_2$ | 64.13 | 7.62 | 12.47 | 64.39 | 7.43 | 12.72 |
| 5 | $C_{13}H_{20}N_2O$ | 70.87 | 9.15 | 12.72 | 70.69 | 9.15 | 13.07 |
| 6 | $C_{14}H_{22}N_2$ | 77.01 | 10.16 | 12.83 | 77.16 | 9.94 | 12.59 |
| 7 | $C_{17}H_{24}N_2O_4$* | 67.73 | 7.55 | 8.74 | 63.03 | 7.49 | 8.76 |
| 8 | $C_{18}H_{26}N_2O_4$* | 64.65 | 7.84 | 8.38 | 64.49 | 7.83 | 8.07 |
| 9 | $C_{18}H_{25}ClN_2O_4$* | 58.61 | 6.83 | 7.60 | 58.69 | 6.65 | 7.48 |
| 10 | $C_{20}H_{28}N_2O_4$* | 66.64 | 7.83 | 7.77 | 66.38 | 7.62 | 7.59 |
| 11 | $C_{21}H_{24}N_2O_4$* | 68.46 | 6.57 | 7.60 | 68.45 | 6.52 | 7.60 |
| 12 | $C_{20}H_{24}N_2O_4$* | 67.39 | 6.79 | 7.86 | 67.77 | 6.80 | 8.10 |

*Fumarate salts.

PREPARATION 13.—1-PHENETHYL-3-ANILINO-PYRROLIDINE

The same general method employed in the preparation of the tosylate in Preparation 1 was used in this preparation with one exception, the p-toluenesulfonyl chloride was replaced with benzenesulfonyl chloride (in a toluene solution). The resultant (1-phenethyl-3-pyrrolidyl)benzenesulfonate (0.11 mole) was mixed with aniline (0.40 mole) and the mixture heated with stirring for two hours at 150° C. and then at reflux for three additional hours. The excess unreacted for three additional hours. The excess unreacted aniline was then distilled at reduced pressure and the residue dissolved in dilute hydrochloric acid. The acidic solution was extracted with ether and then made basic with 25% aqueous sodium hydroxide. The free base which separated was extracted with ether and the ether extracts washed several times with cold water. The ethereal solution was dried over sodium sulfate. The ether was removed by evaporation and the residual oil distilled at reduced pressure, B.P. 173–175° C. at 0.04 mm. pressure. The viscous oil crystallized on standing and melted at 52–53.5° C.; the product was isolated in 46% yield.

*Analysis.*—Calculated for $C_{16}H_{22}N_2$: C, 81.16; H, 8.32; N, 10.52. Found: C, 80.86; H, 8.29; N, 10.62.

PREPARATION 14. — 1-ETHYL-3-(M-TRIFLUOROMETHYLANILINO)PYRROLIDINE N-CYCLOHEXYLSULFAMATE

Utilizing the procedure described in Preparation 13, (1-ethyl-3-pyrrolidyl)benzenesulfonate was heated and reacted with m-trifluoromethylaniline to produce 1-ethyl-3-(m-trifluoromethylanilino)pyrrolidine in 23% yield. Preparation of the cyclohexylsulfamate salt was accomplished by neutralization of the free base with cyclohexylsulfamic acid in isopropanol solvent. The product was precipitated by the addition of isooctane, M.P. 115–116° C.

*Analysis.*—Calculated for $C_{19}H_{30}F_3N_3O_3S$: C, 52.16; H, 6.91; N, 9.60. Found: C, 52.27; H, 7.04; N, 9.65.

PREPARATION 15.—1-(1-CYCLOHEXENYL)-3-ANILINOPYRROLIDINE

Using the method described in Preparation 13, [1-(1-clohexenyl) - 3 - pyrrolidyl]benzenesulfonate is prepared and reacted with aniline to produce 1-(1-cyclohexenyl)-3-anilinopyrrolidine. The 2-cyclohexenyl compound may be prepared similarly by using the appropriate 2-cyclohexnyl starting compound.

PREPARATION 16.—1-ALLYL-3-ANILINOPYRROLIDINE

Using the method of Preparation 13, (1-allyl-3-pyrrolidyl)benzenesulfonate is prepared and reacted with aniline to form 1-allyl-3-anilinopyrrolidine.

PREPARATION 17.—1-METHYL-3-(2-METHYLMERCAPTOANILINO)PYRROLIDINE

Using the method of Preparation 13, (1-methyl-3-pyrrolidyl)benzenesulfonate is prepared and reacted with 2-methylmercaptoaniline to form 1-methyl-3-(2-methylmercaptoanilino)pyrrolidine.

PREPARATION 18.—1-METHYL-3-(4-DIMETHYLAMINOANILINO)PYRROLIDINE

Using the method of Preparation 13, (1-methyl-3-pyrrolidyl)benzenesulfonate is prepared and reacted with 4-dimethylaminoaniline to produce 1-methyl-3-(4-dimethylaminoanilino)pyrrolidine.

In the same manner, numerous other 1-substitutes-3-anilinopyrrolidines within the scope of Formula IV are prepared.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec-butyl, t-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, other lower-alkoxy groups containing various lower alkyl groups having up to eight carbon atoms inclusive are prepared in the same manner from the appropriate different lower-alkoxy starting material. Moreover, when one di-lower-alkylamino group, such as the dimethylamino group, is present in a compound, other di-lower-alkylamino compounds are prepared in the same manner starting only with the selected different di-lower-alkylamino compound. In the same manner, ortho and meta substituted compounds are produced instead of the para by utilizing the selected ortho or meta substituted starting compound, and vice versa. Similarly, other molecular changes are readily made.

As shown in Chart I, the general procedure for the preparation of the compounds of the invention involves several steps, preparation of a 4-beta-haloethyl derivative (VI) and subsequent replacement of the chlorine atom by amino. The appropriately substituted 3-aminopyrrolidine (IV) is first used as starting material, and is allowed to react with a carbonyl halide, as for example, phosgene or carbonyl bromide, which results in production of the resulting intermediate carbamylhalide (V), with spontaneous or nearly spontaneous rearrangement and cleavage of the pyrrolidine ring and formation of an imidazolidinone ring. Heating does facilitate the reaction but is not always essential.

A suitable general procedure for carrying out the process is as follows:

A solution of phosgene, or other carbonyl halide, such as carbonyl bromide, is placed in a suitable reaction vessel, e.g., a three-necked round-bottomed flask equipped with a stirrer, reflux condenser, thermometer and dropping funnel, employing a solvent which is inert under the reaction conditions. Suitable solvents are chloroform, methylene chloride, and the like. The reaction may be carried out at any suitable temperature and in any suitable manner. A preferred temperature range is about zero to 25° C. About five hundred milliliters of solvent per mole of phosgene provides a suitable solution. The appropriate 1-alkyl-3-arylaminopyrrolidine (IV) is added dropwise with stirring while maintaining the temperature within the desired range. The substituted-pyrrolidine reactant is used in a quantity which preferably is at least equimolar to the phosgene or other carbonyl halide used. However, it is preferred that an excess of phosgene, as for example about two molar equivalents, be used in order to improve the yield of the desired product. The temperature may be allowed to rise slowly to room temperature over a suitable period as, for example, about one to two hours, and the solution finally permitted to reflux for a suitable period, such as about four to forty-eight hours. Although the reaction may be carried out at room temperature, elevated temperatures may be advantageously used to shorten the reaction time. After a suitable reaction period, the reaction mixture is cooled to a suitable temperature as for example about zero to 10° C. and the product is separated and isolated in an appropriate manner. The isolation step usually comprises washing the reaction mixture with aqueous mineral acid, aqueous alkali, drying, and concentrating and crystallizing the residue from an appropriate solvent. To facilitate purification when a product is not crystalline, the residue may be distilled at reduced pressure. The resulting product is the 4-beta-haloethyl-1,3-disubstituted-2-imidazolidinone (VI).

Conversion of the halo-derivative (VI), prepared as in the step previously described, to a 4-beta-aminoethyl-1,3-disubstituted-2-imidazolidinone (VII) may be carried out by allowing the halo-derivative (VI) to react with an amine, such as morpholine, dimethylamine, or diethylamine. Any suitable reaction procedure may be used. An excess of the amine is frequently employed.

In the case of relatively non-volatile amines such as morpholine, the halo-derivative is refluxed, usually with at least two molar equivalents of amine, until the reaction is substantially complete. The exact reaction time required may vary depending upon the particular amine used, but two hours is generally sufficient for complete reaction. A solvent, e.g., ethanol, isopropanol, dioxane, ethylene glycol, or the like, may be used, but such solvent is not essential. The excess amine and solvent are removed on a steam bath under reduced pressure. The residue is isolated and the product purified in any appropriate conventional manner.

Reaction of the halo-derivative (VI) with an excess of a volatile amine, such as dimethylamine, may be conducted in a stainless steel reaction bomb employing a suitable reaction solvent, e.g., ethanol, isopropanol, dioxane, or the like. The reactants together with the solvent are sealed in the bomb and heated to a suitable temperature, as for example, about 75–200° C. The reaction may occur at room temperature, but elevated temperatures are usually advantageously employed to shorten the reaction period. The length of the reaction time varies with the type of amine and the temperature range employed, two hours of heating at temperatures within the range of 100–150° C. usually being sufficient to complete the reaction. A longer heating period may frequently be used without any resultant harm to the product. The bomb is cooled and any excess amine and solvent are removed, as under reduced pressure on a steam-heated rotary evaporator. The residue may then be isolated and purified in the manner as described above.

The following examples are given by way of illustration only and are not to be construed as limiting.

The examples immediately following illustrate the preparation of starting 1,3-disubstituted-4-(2-haloethyl)-2-imidazolidinones.

*Example 1.—4-(2-chloroethyl)-1-methyl-3-phenyl-2-imidazolidinone*

A solution of phosgene (0.88 mole) in chloroform (500 ml.) was placed in a two-liter three-necked round-bottomed flask fitted with a stirrer, condenser, dropping funnel and thermometer, and cooled to 0° C. While stirring and maintaining the temperature at 10–15° C., 1-methyl-3-anilinopyrrolidine (0.44 mole) was added dropwise. On completing the addition of the substituted pyrrolidine, stirring was continued for two hours while the temperature rose to 25–30° C. The temperature of the reaction mixture was then raised to reflux for a period of twelve hours. The reaction mixture was cooled to 0–5° C., and washed with hydrochloric acid (6 N, 200 ml.). The chloroform layer was allowed to separate and then washed several times with water. The chloroform extracts were dried over anhydrous sodium sulfate, filtered, and the chloroform evaporated on a rotary steam evaporator under moderate reduced pressure. The isolated residue was purified by vacuum distillation under reduced pressure. The 2-imidazolidinone derivative exhibited a boiling range of 186–190° C. at 0.1 mm. Hg pressure (recrystallized from isopropyl ether; melting point 51–52° C.) and was obtained in 86% yield based on the starting pyrrolidine.

*Analysis.*—Calculated for $C_{12}H_{15}ClN_2O$: C, 60.37; H, 6.33; N, 11.74; Cl, 14.85. Found: C, 60.40; H, 6.44; N, 11.71; Cl, 14.76.

*Example 1A.—4-(2-bromoethyl)-1-methyl-3-phenyl-2-imidazolidinone*

Utilizing the method of Example 1, 1-methyl-3-anilinopyrrolidine is reacted with a solution of carbonyl bromide ($COBr_2$) in chloroform to give 4-(2-bromoethyl)-1-methyl-3-phenyl-2-imidazolidinone.

The following Examples 2 through 11 were carried out in the manner of Example 1 employing the appropriately substituted pyrrolidine as a starting material. The products were isolated and some of their characteristics are listed in Table III.

TABLE III
EXAMPLES 2 THROUGH 11

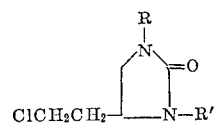

| Example Number | 2-Imidazolidinone R-group | 2-Imidazolidinone R′-group | B.P., °C. | Pressure (mm. Hg) | M.P., °C. | Yield, percent | Remarks |
|---|---|---|---|---|---|---|---|
| 2 | $C_2H_5$ | $C_6H_5$ | 195–200 | 0.08 | 67–68 | 90 | |
| 3 | $C_2H_5$ | $H_3C-\langle\rangle$-$CH_3$ | 172–176 | 0.04 | | 70 | $n_D^{23}$ 1.5447; pale yellow oil. |
| 4 | $C_2H_5$ | $Cl-\langle\rangle$- | 176–180 | 0.05 | | 90 | Yellow oil. |
| 5 | $C_2H_5$ | $CH_3O-\langle\rangle$- | 205–207 | 0.05 | | 87 | Clear amber oil. |
| 6 | $C_2H_5$ | $F_3C-\langle\rangle$ | 152–157 | 0.06 | | 73 | Pale yellow viscous oil; $n_D^{22}$ 1.5181. |
| 7 | $CH(CH_3)_2$ | $C_6H_5$ | 167–170 | 0.02 | 67–69 | 43 | |
| 8 | $CH(CH_3)_2$ | $\langle\rangle$-$CH_3$ | 168–170 | 0.05 | | 41 | Pale yellow oil; $n_D^{22}$ 1.5424. |
| 9 | $CH(CH_3)_2$ | $Cl-\langle\rangle$-$CH_3$ | 185–187 | 0.005 | | 45 | |
| 10 | $C_6H_5CH_2$ | $C_6H_5$ | 228–232 | 0.2 | | 41 | |
| 11 | $C_2H_5$ | naphthyl | 185–188 | 0.03 | | 25 | Pale yellow viscous oil. |

ANALYTICAL DATA ON EXAMPLES 2 THROUGH 11

| Example Number | Empirical Formula | Calculated C | Calculated H | Calculated N | Calculated Cl | Found C | Found H | Found N | Found Cl |
|---|---|---|---|---|---|---|---|---|---|
| 2 | $C_{13}H_{17}ClN_2O$ | 61.77 | 6.78 | 11.08 | 14.03 | 61.93 | 6.76 | 11.01 | 13.95 |
| 3 | $C_{15}H_{21}ClN_2O$ | 64.16 | 7.54 | 9.98 | | 64.43 | 7.52 | 9.77 | |
| 4 | $C_{13}H_{16}Cl_2N_2O$ | 54.36 | 5.62 | 9.76 | 24.69 | 54.52 | 5.42 | 9.47 | 24.37 |
| 5 | $C_{14}H_{19}ClN_2O_2$ | 59.46 | 6.77 | 9.91 | 12.54 | 59.51 | 6.71 | 9.69 | 12.61 |
| 6 | $C_{14}H_{16}ClF_3N_2O$ | 52.42 | 5.03 | 8.73 | | 52.42 | 5.01 | 8.62 | |
| 7 | $C_{14}H_{19}ClN_2O$ | 63.03 | 7.18 | 10.50 | 13.29 | 63.07 | 7.08 | 10.66 | 12.92 |
| 8 | $C_{15}H_{21}ClN_2O$ | 64.16 | 7.54 | 9.98 | | 64.75 | 7.67 | 10.07 | |
| 9 | $C_{15}H_{20}Cl_2N_2O$ | 57.14 | 6.40 | 8.89 | 22.50 | 57.33 | 6.27 | 8.67 | 22.39 |
| 10 | $C_{18}H_{19}ClN_2O$ | 68.67 | 6.08 | 8.90 | 11.26 | 68.70 | 6.03 | 9.16 | 11.10 |
| 11 | $C_{17}H_{19}ClN_2O$ | 67.42 | 6.32 | 9.25 | 11.71 | 68.10 | 6.33 | 9.46 | 11.11 |

Utilizing the process of Example 1 above, the following compounds are prepared from the stated starting materials:

4-(2-chloroethyl)-1-cyclohexyl-3 - phenyl - 2 - imidazolidinone by reacting 1-cyclohexyl-3-anilinopyrollidine and phosgene.

4-(2-chloroethyl)-1-cyclohexenyl-3-phenyl-2 - imidazolidinone by reacting 1-cyclohexenyl-3 - anilinopyrrolidine and phosgene.

4-(2-chloroethyl)-1-allyl-3-phenyl - 2 - imidazolidinone by reacting 1-allyl-3-anilinopyrrolidine and phosgene.

4-(2-chloroethyl)-1-methyl-3-(2 - methylmercaptophenyl)-2-imidazolidinone by reacting 1-methyl-3-(2-methylmercaptoanilino)pyrrolidine with phosgene.

4-(2-chloroethyl)-1-methyl-3 - (4 - dimethylaminophenyl)-2-imidazolidinone by reacting 1-methyl-3-(4-dimethylaminoanilino)pyrrolidine with phosgene.

The 4-(2-aminoethyl)-2-imidazolidinone compounds of the invention are generally prepared by heating a solution of the selected 4-(2-haloethyl)-2-imidazolidinone and the selected amine in a suitable reaction solvent, e.g., ethanol, a higher boiling alcohol such as butanol, a hydrocarbon solvent such as toluene, or the amine itself may be the solvent in some cases. A reaction temperature from about room temperature to about 120° C. is employed, preferably 100 to 120° C., and a reaction period of about eight to twenty-four hours is usually adequate. Higher reaction temperatures increase the speed of reaction but tend to increase the incidence of undesired side reactions, while temperatures below 100° C. frequently require undesirably lengthy reaction periods. Pressure to the extent generated in a sealed system is frequently employed to facilitate the reaction. The amine is usually employed in excess, at least two molar equivalents of the amine being preferred per each molar equivalent of starting halogen compound. The resulting solution of the amine reaction product is concentrated, as in vacuo, and the amine product isolated, usually as a crystalline hydrohalide salt. In most cases the hydrohalide salts, e.g., the hydrochloride, crystallize as the hydrate. In cases where a crystalline salt is difficult or impossible to obtain, the free basic amine itself may be distilled and crystallized from a solvent or solvent mixture or alternatively isolated as an oil by fractional distillation. Extraction of the reaction product with a suitable solvent, e.g., ether, benzene, toluene, or ethyl acetate, frequently assists in recovering all of the available product for isolation by crystallization or the like and concentrated acid, e.g., 2 N HCl, or anhydrous ketones, e.g., methyl ethyl ketone, are frequently of value as the solvent or medium from which crystallization or recrystallization is effected. Where the free base is desired, this may be obtained conventionally by neutralizing the reaction product or a solution of the isolated salt with a base such as ammonia, ammonium hydroxide, sodium carbonate, or other suitable alkaline material, extracting the liberated base with a suitable solvent such as ethyl acetate or benzene, drying the extract and evaporating to dryness in vacuo or fractionally distilling, or in other conventional manner. Numerous acid addition as well as quaternary ammonium (onium) salts may be prepared from the free bases, either isolated or without isolation from the reaction product, as already indicated in the foregoing. The amine preparation is illustrated by the following specific examples.

*Example 12.—4-(2-pyrrolidinoethyl)-1-ethyl-3-(3-trifluoromethylphenyl)-2-imidazolidine fumarate*

An excess of pyrrolidine (200 milliliters) was added to 4-(2-chloroethyl)-1-ethyl-3-(3-trifluoromethylphenyl) - 2-imidazolidinone (0.078 mole) and the mixture was refluxed for twelve hours. Excess pyrrolidine was removed under reduced pressure and the concentrate partitioned between ether and water. The ether extracts were washed with water, dried over sodium sulfate and the ether removed by evaporation. The residual oil (free base; 80% yield) was dissolved in isopropanol and treated with fumaric acid. The product crystallized on addition of a small amount of isopropyl ether. The resultant fumarate salt was recrystallized from methyl ethyl ketone and ether, melting point 160–160.5° C.

*Analysis.*—Calculated for $C_{22}H_{28}F_3N_3O_5$: C, 56.04; H, 5.99; N, 8.91. Found: C, 56.18; H, 6.10; N, 8.86.

*Example 13.—4-(2-morpholinoethyl)-1-ethyl-3-(3-trifluoromethylphenyl)-2-imidazolidinone fumarate*

This compound was prepared in the manner of the preceding example except that morpholine was used instead of pyrrolidine. The morpholine hydrochloride was isolated from the initial reflux step by filtration from the ether extract leaving the desired free base in the ether filtrate. Removal of the ether by evaporation yielded the oily free base which was converted to the fumarate salt. Recrystallization of the fumarate salt from methyl ethyl ketone and isopropanol using a trace of ether gave the desired product, melting at 172–173° C., in 92% yield.

*Analysis.*—Calculated for $C_{22}H_{28}F_3N_3O_6$: C, 54.20; H, 579; N, 8.62. Found: C, 54.00; H, 5.58; N, 8.73.

*Example 14.—4-(2-morpholinoethyl)-1-isopropyl-3-phenyl-2-imidazolidinone*

Morpholine (100 milliliters) was added to 4-(2-chloroethyl)-1-isopropyl-3 - phenyl - 2 - imidazolidinone (0.585 mole) and the solution refluxed for two hours. Excess morpholine was removed on a steam bath under reduced pressure and the residue then dissolved in dilute aqueous hydrochloric acid (200 milliliters). The solution was washed with ether. The aqueous acid solution was made basic with sodium hydroxide and extracted with chloroform. The chloroform extract was dried over sodium sulfate and concentrated. The residue crystallized on standing; 94.5% yield. The product was recrystallized from isopropyl ether, melting point 88° C.

*Analysis.*—Calculated for $C_{18}H_{27}N_3O_2$: C, 68.11; H, 8.58; N, 13.24. Found: C, 68.17; H, 8.49; N, 13.17.

*Example 15.—4-(2-morpholinoethyl)-1-cyclohexyl-3-phenyl-2-imidazolidinone maleate*

An excess of morpholine (200 milliliters) was added to 4-(2-chloroethyl)-1 - cyclohexyl - 3 - phenyl-2-imidazolidinone (0.16 mole) and the solution was refluxed for 48 hours. On cooling, the morpholine hydrochloride crystallized out and was removed by filtration. The remaining filtrate was concentrated on a rotary steam evaporator at reduced pressure. The concentrate was made acid with aqueous hydrochloric acid (6 N) and extracted with ether. The acid solution was then made basic with aqueous sodium hydroxide (6 N) and extracted with ether. The ether extract from the basic aqueous solution was dried and evaporated to yield an oil which was converted to the maleate salt from an isopropanol and isopropyl ether solvent system. The product melted at 141–142° C. and was obtained in 90% yield.

*Analysis.*—Calculated for $C_{25}H_{35}N_3O_6$: C, 63.40; H, 7.45; N, 8.87. Found: C, 63.64; H, 7.45; N, 8.93.

*Example 16.—4-(2-morpholinoethyl)-1-benzyl-3-phenyl-2-imidazolidinone*

An excess of morpholine (50 milliliters) was added to 4-(2-chloroethyl)-1-benzyl - 3 - phenyl-2-imidazolidinone (0.0635 mole) and the reaction solution was refluxed for four hours. The reaction solution was then cooled and concentrated in vacuo. The residue was dissolved in dilute aqueous hydrochloric acid and washed with isopropyl ether to remove any unreacted material. The aqueous acid layer was extracted with chloroform and the chloroform extract containing the hydrochloride was washed with dilute aqueous sodium hydroxide to form the free base, dried over sodium sulfate and concentrated in vacuo.

The product was recrystallized from 50% ethanol, melting point 119–121° C.; 39% yield.

*Analysis.*—Calculated for $C_{22}H_{27}N_3O_2$: C, 72.30; H, 7.45; N, 11.50. Found: C, 72.18; H, 7.58; N, 11.31.

*Example 17.—4-(2-dimethylaminoethyl)-1-ethyl-3-(4-methoxyphenyl)-2-imidazolidinone hydrochloride*

A stainless steel bomb was charged with 4-(2-chloroethyl)-1-ethyl-3-(4-methoxyphenyl) - 2 - imidazolidinone (0.1 mole), absolute ethanol (100 milliliters) and dimethylamine (3.0 moles). The bomb was sealed and heated for 24 hours at 150° C. The reaction mixture was chilled and transferred to a flask where excess amine and ethanol were removed under reduced pressure. The residue was acidified, washed with ether, then basified with sodium hydroxide (6 N aqueous solution) and extracted with ether. The ether extracts were dried, the ether removed under reduced pressure and the residue (free base) vacuum distilled; boiling point 172–177° C. at 0.008 mm. Hg pressure. The free base was converted to the hydrochloride salt by treatment of an isopropanol solution of the base with an ethereal solution of hydrochloric acid. The hydrochloric salt was recrystallized from isopropanol-isopropyl ether solvent in 30% yield, melting point, 153–153.5° C.

*Analysis.*—Calculated for $C_{16}H_{26}ClN_3O_2$: C, 58.61; H, 7.99; N, 12.82; Cl, 10.82. Found: C, 58.83; H, 8.15; N, 12.58; Cl, 10.73.

*Example 18.—4-(2-dimethylaminoethyl)-1-ethyl-3-phenyl-2-imidazolidinone hydrochloride*

Utilizing the method of Example 31, 4-(2-chloroethyl)-1-ethyl-3-phenyl-2-imidazolidinone is reacted with dimethylamine to give 4-(2-dimethylaminoethyl)-1-ethyl-3-phenyl-2-imidazolidinone.

*Example 19.—4-(2-diethylaminoethyl)-1-ethyl-3-(4-methoxyphenyl)-2-imidazolidinone fumarate*

The same procedure was employed as described in the preceding example except that diethylamine was used instead of dimethylamine. The free base was isolated by distillation under reduced pressure; boiling point 173–180° C. at 0.0075 mm. Hg pressure. The free base was converted to the fumarate salt in isopropanol and crystallized on dilution with a small quantity of isopropyl ether in 28% yield, melting point 133–134° C.

*Analysis.*—Calculated for $C_{22}H_{33}N_3O_6$: C, 60.67; H, 7.64; N, 9.65. Found: C, 60.78; H, 7.77; N, 9.44.

Using the process described in Example 17, the following compounds are prepared from the stated starting materials:

4 - (2-morpholinoethyl)-1-cyclohexyl-3-phenyl-2-imidazolidinone by reacting 4-(2-chloroethyl)-1-cyclohexyl-3-phenyl-2-imidazolidinone with morpholine.

4 - (2 - morpholinoethyl)-1-allyl-3-phenyl-2-imidazolidinone by reacting 4-(2-chloroethyl)-1-allyl-3-phenyl-2-imidazolidinone with morpholine.

4 - (2 - dimethylaminoethyl)-1-ethyl-3-(4-methylphenyl) - 2-imidazolidinone by reacting 4-(2-chloroethyl-1-ethyl-3-(4-methylphenyl)-2-imidazolidinone wtih dimethylamine.

4 - (2 - morpholinoethyl)-1-isopropyl-3-(2,4-dimethylphenyl)-2-imidazolidinone by reacting 4-(2-chloroethyl)-1 - isopropyl - 3-(2,4-dimethylphenyl)-2-imidazolidinone with morpholine.

4 - (2 - morpholinoethyl) - 1-isopropyl-3-(2-chlorophenyl)-2-imidazolidinone by reacting 4-(2-chloroethyl)-1 - isopropyl - 3-(2-chlorophenyl)-2-imidazolidinone with morpholine.

4 - (2 - morpholinoethyl) - 1-isopropyl-3-(4-chloro-2-methylphenyl)-2-imidazolidinone by reacting 4-(2-chloroethyl) - 1 - isopropyl-3-(4-chloro-2-methylphenyl)-2-imidazolidinone with morpholine.

4 - (2 - diethylaminoethyl)-1-ethyl-3-(4-methylmercaptophenyl)-2-imidazolidinone by reacting 4-(2-chloroethyl) - 1 - ethyl-3-(4-methylmercaptophenyl)-2-imidazolidinone with diethylamine.

4 - (2 - diethylaminoethyl)-1-ethyl-3-(4-dimethylaminophenyl)-2-imidazolidinone by reacting 4-(2-chloroethyl)-1 - ethyl - 3-(4-dimethylaminophenyl)-2-imidazolidinone with diethylamine.

Where the foregoing examples produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec-butyl, t-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds, are prepared starting from the appropriate halogenated starting material. Similarly, where methoxy or other lower-alkoxy group is present, other lower-alkoxy groups containing various lower-alkyl groups having up to eight carbon atoms inclusive are prepared in the same manner from the appropriate different lower-alkoxy starting material. Moreover, when one di-lower-alkylamino group, such as the dimethylamino group, is present in a compound, other dilower-alkylamino compounds are prepared in the same manner starting only with the selected different dilower-alkylamino compound. In the same manner, ortho and meta products are produced instead of the para by utilizing the selected ortho or meta substituted starting material, and vice versa. Similarly other molecular changes within the scope of the invention are readily made.

*Formulation and administration.*—Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds. while effective, are preferably formulated and administered in the form of their non-toxic acid-addition or quaternary ammonium salts for purposes of convenience of crystallization, increased solubility, and the like.

Although very small quantities of the active materials of the present invention, even as low as 0.1 milligram, are effective when minor therapy is involved or in cases of administration to subjects having a relatively low body weight, unit dosages are usually five milligrams or above and preferably twenty-five, fifty or one-hundred milligrams or even higher, depending of course upon the emergency of the situation and the particular result, e.g., analeptic or hypotensive, desired. Five to fifty milligrams appears optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian. Results upon administration of these novel materials have thus far proved extremely gratifying.

The formulations of Example 20 are representative for the pharmacologically active compounds of the invention, but have been especially designed to embody as active ingredient 1-lower-alkyl-3-phenyl - 4 - (beta-aminoethyl) imidazolidinones, especially the dilower-alkylaminoethyl or heterocyclic aminoethyl compounds, or their hydrochlorides, hydrobromides, methiodides, or like pharmaceutically acceptable salts.

Example 20.—Formulations

(1) CAPSULES

Capsules of 5 mg., 25 mg., and 50 mg. of active ingredient per capsule are prepared. With the higher amounts of active ingredient, reduction may be made in the amount of lactose.

Typical blend for encapsulation:   Per capsule, mg.
- Active ingredient, as salt _____ 5.0
- Lactose _____ 296.7
- Starch _____ 129.0
- Magnesium stearate _____ 4.3

Total _____ 435.0

Additional capsule formulations preferably contain a higher dosage of active ingredient and are as follows:

| Ingredients | 100 mg. per capsule | 250 mg. per capsule | 500 mg. per capsule |
| --- | --- | --- | --- |
| Active ingredient, as salt | 100.0 | 250.0 | 500.0 |
| Lactose | 231.5 | 126.5 | 31.1 |
| Starch | 99.2 | 54.2 | 13.4 |
| Magnesium Stearate | 4.3 | 4.3 | 5.5 |
| Total | 435.0 | 435.0 | 550.0 |

In each case, uniformly blend the selected active ingredient with lactose, starch, and magnesium stearate and encapsulate the blend.

(2) TABLETS

A typical formulation for a tablet containing 5.0 mg. of active ingredient per tablet follows. The formulation may be used for other strengths of active ingredient by adjustment of weight of dicalcium phosphate.

Per tablet, mg.
- (1) Active ingredient _____ 5.0
- (2) Corn starch _____ 13.6
- (3) Corn starch (paste) _____ 3.4
- (4) Lactose _____ 79.2
- (5) Dicalcium phosphate _____ 68.0
- (6) Calcium stearate _____ 0.9

Total _____ 170.1

Uniformly blend 1, 2, 4 and 5. Prepare 3 as a 10 percent paste in water. Granulate the blend with starch paste and pass the wet mass through an eight mesh screen. The wet granulation is dried and seized through a twelve mesh screen. The dried granules are blended with the calcium stearate and compressed.

Additional tablet formulations preferably contain a higher dosage of the active ingredient and are as follows:

A. 50 MG. TABLET

Ingredients:   Per tablet, mg.
- Active ingredient, as salt _____ 50.0
- Lactose _____ 90.0
- Milo starch _____ 20.0
- Corn starch _____ 38.0
- Calcium stearate _____ 2.0

Total _____ 200.0

Uniformly blend the active ingredient, lactose, milo starch and corn starch. This blend is granulated using water as a granulating medium. The wet granules are passed through an eight mseh screen and dried at 140 to 160 degrees Fahrenheit overnight. The dried granules are passed through a number ten mesh screen and blended with the proper amount of calcium stearate and this blend is then converted into tablets on a suitable tablet press.

B. 100 MG. TABLET

Ingredients:   Per tablet, mg.
- Active ingredient, as salt _____ 100.0
- Lactose _____ 190.0
- Dicalcium phosphate _____ 172.2
- Starch _____ 54.0
- Milo starch _____ 21.6
- Calcium stearate _____ 2.2

Total _____ 540.0

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

C. 250 MG. TABLET

Ingredients:   Per tablet, mg.
- Active ingredient, as salt _____ 250.0
- Corn starch _____ 56.0
- Carbowax 6000 (polyethylene glycol of M.W. approximately 6000) _____ 25.0
- Lactose _____ 35.0
- Magnesium stearate _____ 4.0

Total _____ 370.0

Uniformly blend the active ingredient, corn starch, Carbowax 6000, lactose, and one-half the weight of magnesium stearate required. This blend is then "slugged" on a suitable tablet press. These "slugs" are granulated through a ten mesh screen on an oscillating granulator. These granules are then blended with the remainder of the magnesium stearate and the lubricated granules are then converted into tablets on a suitable tablet press.

D. 500 MG. TABLET

Ingredients:   Per tablet, mg.
- Active ingredient, as salt _____ 500.0
- Corn starch (wet) _____ 86.4
- Milo starch _____ 32.4
- Calcium stearate _____ 3.2
- Corn starch (dry) _____ 26.0

Total _____ 648.0

Uniformly blend the active ingredient, corn starch and milo starch. This blend is wet granulated using water and the wet mass is passed through a number eight mesh screen. These wet granules are dried overnight at 140–160 degrees Fahrenheit. The dried granules are passed through a number ten mesh screen. The dried granules and weighed amounts of corn starch and calcium stearate are uniformly blended and these lubricated granules are compressed on a suitable tablet press.

(3) INJECTABLE, 2% STERILE SOLUTION

Per cc.
- Active ingredient _____ 20 mg.
- Preservative, e.g., chlorobutanol __ 0.5% weight/volume.
- Water for injection, q.s.

Preparation solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspensions or syrups, and in other acceptable dosage forms.

Various modifications and equivalents will be apparent to one skilled in the art and may be made in the compounds, compositions, methods, and procedures of the present invention without departing from the spirit or scope thereof, and it is therefore to be understood that the invention is to be limited only by the scope of the appended claims.

We claim:
1. A compound selected from the group consisting of (a) 4-(2-aminoethyl)-2-imidazolidinones having the formula:

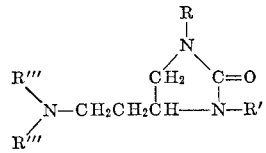

wherein R is selected from the group consisting of lower-alkyl, lower-alkenyl, phenyllower-alkyl, cycloalkyl having a maximum of 9 carbon atoms, and cycloalkenyl having a maximum of 9 carbon atoms,
wherein R' is selected from the group consisting of phenyl, lower-alkylphenyl, di-lower-alkylphenyl, lower-alkoxyphenyl, halophenyl, trifluoromethylphenyl, lower-alkylhalo-phenyl, lower-alkylmercaptophenyl, di-lower-alkyl-aminophenyl, and naphthyl, and
wherein

is an amino radical selected from the group consisting of amino (—NH₂), lower-alkyl-amino, di-lower-alkyl-amino, lower-alkenyl-amino, di-lower-alkenyl-amino, phenylamino, (hydroxy-lower-alkyl)-amino, di-(hydroxy - lower - alkyl)-amino, lower-alkyl-(hydroxy-lower-alkyl)-amino, basic saturated monocyclic heterocyclic radicals having up to a maximum of twelve carbon atoms selected from the group consisting of piperidino, lower - alkyl - piperidino, di - lower - alkyl-piperidino, lower-alkoxy-piperidino, pyrrolidino, lower-alkyl - pyrrolidino, di-lower - alkyl - pyrrolidino, lower-alkoxy-pyrrolidino, morpholino, lower-alkyl-morpholino, di-lower-alkyl-morpholino, lower-alkoxy-morpholino, thiomorpholino, lower-alkyl-thiomorpholino, di-lower-alkyl-thiomorpholino, lower-alkoxy-thiomorpholino, piperazino, lower-alkyl-piperazino, di-C-(lower-alkyl) - piperazino, N⁴-(lower-alkyl)-C-(lower-alkyl)-piperazino, N - (hydroxy - lower - alkyl) - piperazino, N - (lower - alkanoyloxy lower - alkyl) - piperazino, lower - alkoxy - piperazino, N' - lower - alkoxy - lower-alkylpiperazino, lower - carbalkoxy - piperazino, N-lower-alkanoyl - N - lower - alkylamino, and N - lower-alkanoylamino, and
(b) quaternary ammonium and acid-addition salts thereof.

2. A compound of claim 1 selected from the group consisting of 4-(2-dilower-alkylaminoethyl)-1-lower-alkyl-3-phenyl-2-imidazolidinone and pharmaceutically acceptable acid addition and quaternary ammonium salts thereof.

3. A compound of claim 1 selected from the group consisting of 4 - (2 - morpholinoethyl) - 1 - lower - alkyl-3-phenyl-2-imidazolidinone and pharmaceutically acceptable acid addition and quaternary ammonium salts thereof.

4. A compound of claim 1 selected from the group consisting of 4 - (2 - dilower - alkylaminoethyl) - 1 - lower-alkyl - 3 - lower-alkoxy-phenyl-2-imidazolidinone and pharmaceutically acceptable acid addition and quaternary ammonium salts thereof.

5. A compound of claim 1 selected from the group consisting of 4 - (2 - morpholinoethyl) - 1 - lower - alkyl-3-trifluoromethylphenyl-2-imidazolidinone and pharmaceutically acceptable acid addition and quaternary ammonium salts thereof.

6. A compound of claim 1 selected from the group consisting of 4 - (2 - pyrrolidinoethyl) - 1 - lower - alkyl-3-trifluoromethylphenyl-2-imidazolidinone and pharmaceutically acceptable acid addition and quaternary ammonium salts thereof.

7. A compound of claim 1 which is a 4-(2-dimethylaminoethyl) - 1 - ethyl - 3 - phenyl - 2 - imidazolidinone pharmaceutically acceptable acid addition salt.

8. A compound of claim 1 which is a 4 - (2 - morpholinoethyl) - 1 - isopropyl - 3 - phenyl - 2 - imidazolidinone pharmaceutically acceptable acid addition salt.

9. A compound of claim 1 which is a 4 - (2 - morpholinoethyl) - 1 - cyclohexyl - 3 - phenyl - 2 - imidazolidinone pharmaceutically acceptable acid addition salt.

10. A compound of claim 1 which is a 4 - (2 - morpholinoethyl) - 1 - benzyl - 3 - phenyl - 2 - imidazolidinone pharmaceutically acceptable acid addition salt.

11. A compound of claim 1 which is a 4 - (2 - morpholinoethyl) - 1 - ethyl - 3 - (3 - trifluoromethylphenyl) - 2-imidazolidinone pharmaceutically acceptable acid addition salt.

12. A compound of claim 1 which is a 4 - (2 - dimethylaminoethyl) - 1 - ethyl - 3 - (4 - methoxyphenyl - 2-imidazolidinone pharmaceutically acceptable acid addition salt.

13. A compound of claim 1 which is a 4 - (2 - diethylaminoethyl) - 1 - ethyl - 3 - (4 - methoxyphenyl) - 2-imidazolidinone pharmaceutically acceptable acid addition salt.

14. A compound of claim 1 which is a 4 - (2 - pyrrolidinoethyl) - 1 - ethyl - 3 - (3 - trifluoromethylphenyl)-2 - imidazolidinone pharmaceutically acceptable acid addition salt.

15. A compound of claim 1 which is selected from the group consisting of 4 - (2 - pyrrolidinoethyl) - 1 - ethyl-3 - (3 - trifluoromethylphenyl) - 2 - imidazolidinone fumarate, 4 - (2 - morpholinoethyl) - 1 - ethyl - 3 - (3-trifluoromethylphenyl) - 2 - imidazolidinone fumarate, 4 - (2 - morpholinoethyl) - 1 - isopropyl - 3 - phenyl - 2-imidazolidinone, 4 - (2 - morpholinoethyl) - 1 - cyclohexyl - 3 - phenyl - 2 - imidazolidinone maleate, 4 - (2-morpholinoethyl) - 1 - benzyl - 3 - phenyl - 2 - imidazolidinone, 4 - (2 - dimethylaminoethyl) - 1 - ethyl - 3-(4 - methoxyphenyl) - 2 - imidazolidinone hydrochloride, 4 - (2 - dimethylaminoethyl) - 1 - ethyl - 3 - phenyl - 2-imidazolidinone hydrochloride, and 4 - (2 - diethylaminoethyl) - 1 - ethyl - 3 - (4 - methoxyphenyl) - 2 - imidazolidinone fumarate.

References Cited

UNITED STATES PATENTS 3,196,152    7/1965    Wright et al. _____ 260—247.2

ALEX MAZEL, *Primary Examiner.*

J. TOVAR, *Assistant Examiner.*

UNITED STATES PATENT OFFICE
CERTIFICATE OF CORRECTION

Patent No. 3,365,450                         January 23, 1968

Carl D. Lunsford

It is hereby certified that error appears in the above numbered patent requiring correction and that the said Letters Patent should read as corrected below.

Column 1, line 40, "holaphenyl" should read -- halophenyl --. Column 4, Chart I, Group (III'), that portion of the formula reading $$C\diagup \quad \text{should read} \quad CH_2\diagup$$

same column 4, same Chart I, Group (VII), that portion of the formula reading $$R''CH_2CH_2CH_2\!-\!N\!-\!R \quad \text{should read} \quad R''\!-\!CH_2CH_2CH\!-\!N\!-\!R'$$

Column 8, line 71, "clohexenyl" should read -- cyclohexenyl --. Column 9, line 20, "1-substitutes" should read -- 1-substituted --. Column 13, line 5, "anilinopyrollidine" should read -- anilinpyrrolidine --. Column 14, line 22, "579" should read -- 5.79 --. Column 15, line 23, "hydrochloric" should read -- hydrochloride --; line 32, "Example 31" should read --Example 16 --; line 59, "chloroethyl-1-" should read -- chloroethyl)-1- --. Column 17, line 52, "seized' should read -- sized --; line 71, "mseh" should read -- mesh --. Column 18, line 65, "Preparation" should read -- Prepare --.

Signed and sealed this 19th day of August 1969.

(SEAL)
Attest:

EDWARD M. FLETCHER,JR.                     WILLIAM E. SCHUYLER, JR.
Attesting Officer                             Commissioner of Patents